May 5, 1964 H. S. MIN ETAL 3,132,002

PROCESS CONTROL

Filed Sept. 23, 1960 2 Sheets-Sheet 1

INVENTOR.
HYUNG S. MIN
PAUL E. PARISOT
BY *Lloyd B. Stevens, Jr*
ATTORNEY

United States Patent Office
3,132,002
Patented May 5, 1964

3,132,002
PROCESS CONTROL
Hyung S. Min, St. Louis, and Paul E. Parisot, Creve
Coeur, Mo., assignors to Monsanto Chemical Company,
St. Louis, Mo., a corporation of Delaware
Filed Sept. 23, 1960, Ser. No. 58,031
2 Claims. (Cl. 23—230)

The invention relates to a new and improved method of controlling a chemical process.

Many ways are known for controlling chemical processes such as controlling relative rates of addition of reactants, temperature control, pressure control, liquid level control, etc.; however, previously control of residence time in a reactor has not been used to maintain a desired level of concentration of product in the effluent from the reactor.

It is an object of this invention to provide a new and improved method of controlling a chemical reaction.

It is another object of this invention to provide a new method of controlling a chemical reaction usable in conjunction with known control method to secure improved control of a chemical reaction.

These and other objects of the invention will become apparent as the detailed description of the invention proceeds.

The new and improved control method of the invention applicable to continue processes involves controlling the residence time of reactants in a second-order chemical reaction to maintain a desired level of concentration of product in the effluent from the process. Residence time control can be used in conjunction with known control methods such as the control of the rate of addition of one reactant with respect to the other to secure an even more versatile control system than when using residence control alone.

The control system of the invention is an alternative to temperature control which is conventionally used. In addition it may have an advantage over temperature control since for an exothermic reaction, an increase in the reaction time can be caused by increasing reactor volume. This result in increasing the effective heat transfer area and thus providing a better means of removing the added heat generated by the reaction. This method can thus be important where heat sensitive materials are present. This control system of the invention will probably be most important in controlling the effects of side reactions on the process rather than in altering the rate of the main reaction.

The invention will be more clearly understood from the following detailed description thereof read in conjunction with the accompanying drawings wherein.

A typical process which can be controlled by the method of the invention is a process for the chlorination of benzene, and the following is a description of suitable conditions for carrying out this process using the inventive control method:

Flow rate:
    Benzene input _____ lb./hr__ 1000
    Effluent _____ lb./hr__ 1203.6
    Chlorine _____ lb./hr__ 203.6
(Chlorine pressure in the reactor to be maintained at 1 atmosphere.)
Pressure _____ atmosphere__ 1
Temperature _____ ° C__ 49

Effluent compositions, wt. percent:
    Benzene _____ 50
    Monochlorobenzene _____ 40
    Dichlorobenzene _____ 10
Kinetic constants:[1]
    $k_1 = .600$/hr. atm.
    $k_2 = .150$/hr. atm.
Reactor volume _____ ft.$^3$__ 26

[1] Note that the kinetic constant has units of atmospheres rather than concentration of chlorine in the liquid in weight percent.

For analysis of the effluent a specific gravity analyzer, a refractive index analyzer, a dielectric constant analyzer, a light dispersion analyzer or a combination of two of these analyzers, if it is desired to separately measure the amount of mono- and dichlorobenzenes, can be used.

Figure 1:
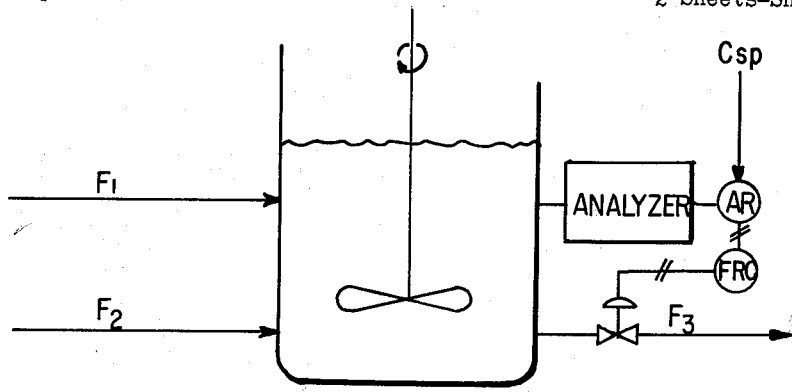
FIGURE 1 is a schematic drawing of one embodiment of the invention.

Referring now to FIGURE 1, a stirred tank continuous reactor is shown controlled by a method of the invention. Suitably the volume of the reactor is twice that of the normal volume of reactants and product contained in the reactor during operation. $F_1$ and $F_2$ represent the feed rates of the two reactants going into the reactor. To determine the composition of the product in the reaction mixture a conventional analyzer is used. This analyzer, of course, is selected with reference to the specific reaction mixture being analyzed. The analyzer provides the information for operating AR the analyzer recorder which records the percentage product in the reactor composition. $C_{sp}$ represents the composition setpoint for the analyzer recorder. When the percent composition of the product in the reactor effluent is not the same as the composition setpoint ($C_{sp}$) an error signal is fed to the FRC which is a flow rate recorder and controller controlling by valve the rate of effluent withdrawal $F_3$ from the reactor. Depending on whether this error signal from the analyzer recorder is plus or minus and the degree thereof the valve controlling the reactor effluent will be opened or closed proportionately. Thus the level in the reactor will be raised or lowered and the residence time of the reactant in the eractor will be increased or decreased. As will be seen in later discussion of the invention the method of control of FIGURE 1 is operable in a system wherein relatively small changes of either $F_1$ or $F_2$ are likely to occur, i.e., of the order of about 10% or less.

Figure 2:
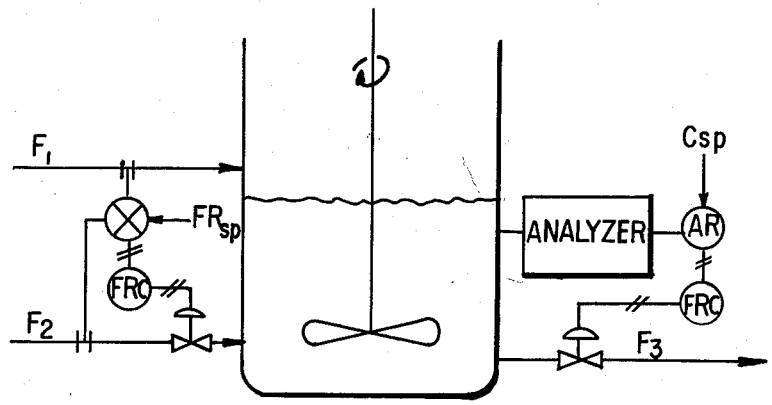
FIGURE 2 is a schematic drawing of another embodiment of the invention.

FIGURE 2 shows another embodiment of the invention where in addition to the control of the residence time the rate of flow $F_2$ of one reactant is controlled with respect to the rate of flow $F_1$ of the other reactant. In this system the rate of flow $F_1$ is measured by a flow meter in the line. This flow meter feeds the rate of flow $F_1$ into an instrument having a flow ratio setpoint ($FR_{sp}$). The flow rate $F_2$ of the second reactant is also measured by a flow meter in its line and this information is fed into the same instrument as is the $F_1$ flow rate information. The flow rates of the two streams $F_1$ and $F_2$ are compared in the instrument and if they vary from the flow ratio setpoint ($FR_{sp}$) which has been selected, an error signal is transmitted to flow recorder controller FRC which controls by valve the flow rate $F_2$. Depending upon whether the error signal is plus or minus and a degree thereof the valve in the line of $F_2$ will be opened or closed in varying degrees to control the flow rate $F_2$. By the control embodiment shown in FIGURE 2 a much tighter control is maintained on the reaction system. The control system of FIGURE 2 is operable regardless of the degree of upset or change of $F_1$ with respect to $F_2$ since the flow ratio controller system will immediately act to restore the proper ratio of reactants.

Suitably the analyzers, flow meters, control instruments, valves and other equipment of FIGURES 1 and 2 can be selected from well known commercially available equipment. A person skilled in the art to which this invention pertains having these teachings of the invention would have no difficulty selecting equipment to suit his particular reaction. For example, depending on the particular reactants involved, a specific gravity analyzer could be used to determine the percent of product in the reactor effluent.

Figure 3:
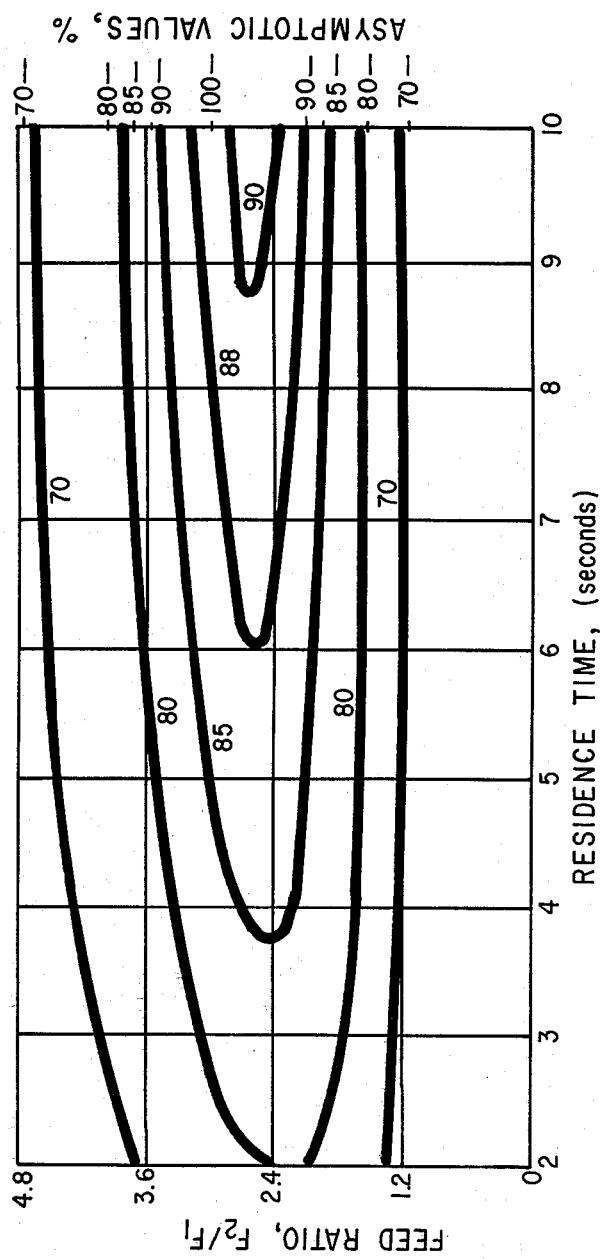
FIGURE 3 is a graph of a family of curves of constant product compositions with residence time as abscissas and feed ratio as ordinates.

In FIGURE 3 is shown a family of curves or contours for constant percent product compositions, residence time in seconds being plotted as abscissas versus ordinates of feed ratio $F_2/F_1$. Thus curves are shown for 70%, 80%, 85% etc. of product in the reaction mixture. On the right hand side of FIGURE 3 are shown the asymptotic values for the contours, i.e., for infinite residence time. This is a typical family of curves for a second order chemical reaction. They will in general be hyperbolic in shape. An analog computer was used to plot these curves and to examine the operation of the control methods of the invention using the curves. To illustrate the limitations of the control system of FIGURE 1 wherein residence time control alone is used, it is assumed that it is desired to control the percent of product in the reaction mixture, i.e., the effluent $F_3$, to 85%. If an upset of either the flow rates $F_1$ or $F_2$ is so substantial as to change the feed ratio beyond the limits of the asymptotic values for 85%, obviously the control system of FIGURE 1 could not operate in again bring the system within control at the 85% composition. On the other hand if the control system of FIGURE 2 is used, no flow rate upset however large of $F_1$ can change the flow ratio $F_2/F_1$ more than momentarily since it is controlled. Thus the system of FIGURE 2 can always maintain control to the desired percentage composition of product regardless of the degree of upset of reactant flow rate in the process.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. The method of controlling the product concentration in the effluent of a continuous reaction process involving a second-order chemical reaction, said process comprising the analyzing of the contents of a reaction vessel to determine the percentage of product concentration, determining any deviation between the analyzed product concentration and a selected control composition, initiating a corrective signal if a deviation is detected, transmitting the corrective signal to a dynamically reactive means which regulates the rate of effluent withdrawal from the process, and controlling the vessel contents residence time as a function of the effluent withdrawal proportional to the size of the corrective signal.

2. The method of controlling the product concentration in the effluent of a continuous reaction process involving a second-order chemical reaction and having two streams of reactants entering said vessel; said method comprising the measuring of the flow rate of each of said streams of reactants, comparing the flow rates of each of the streams with a setpoint flow ratio, initiating an error signal if a deviation is detected, transmitting the error signal to a dynamically reactive means in one of the streams of reactants for regulating the rate of introduction of that reactant as a function of the rate of introduction of the other reactant, analyzing the contents of the reaction vessel to determine the percentage of product concentration, determining any deviation between the analyzed product concentration and a selected control composition, initiating a corrective signal if a deviation is detected, transmitting the corrective signal to a dynamically reactive means which regulates the rate of effluent withdrawal from the process, and controlling the vessel contents residence time as a function of the effluent withdrawal proportional to the size of the corrective signal.

References Cited in the file of this patent

UNITED STATES PATENTS

| | | |
|---|---|---|
| 2,766,265 | Goldsmith et al. | Oct. 9, 1956 |
| 2,909,413 | Hildyard | Oct. 20, 1959 |

UNITED STATES PATENT OFFICE
CERTIFICATE OF CORRECTION

Patent No. 3,132,002

May 5, 1964

Hyung S. Min et al.

It is hereby certified that error appears in the above numbered patent requiring correction and that the said Letters Patent should read as corrected below.

Column 1, line 29, for "continue" read -- continuous --; column 3, line 45, for "in" read -- to --.

Signed and sealed this 8th day of December 1964.

(SEAL)
Attest:

ERNEST W. SWIDER
Attesting Officer

EDWARD J. BRENNER
Commissioner of Patents